Patented Dec. 16, 1924.

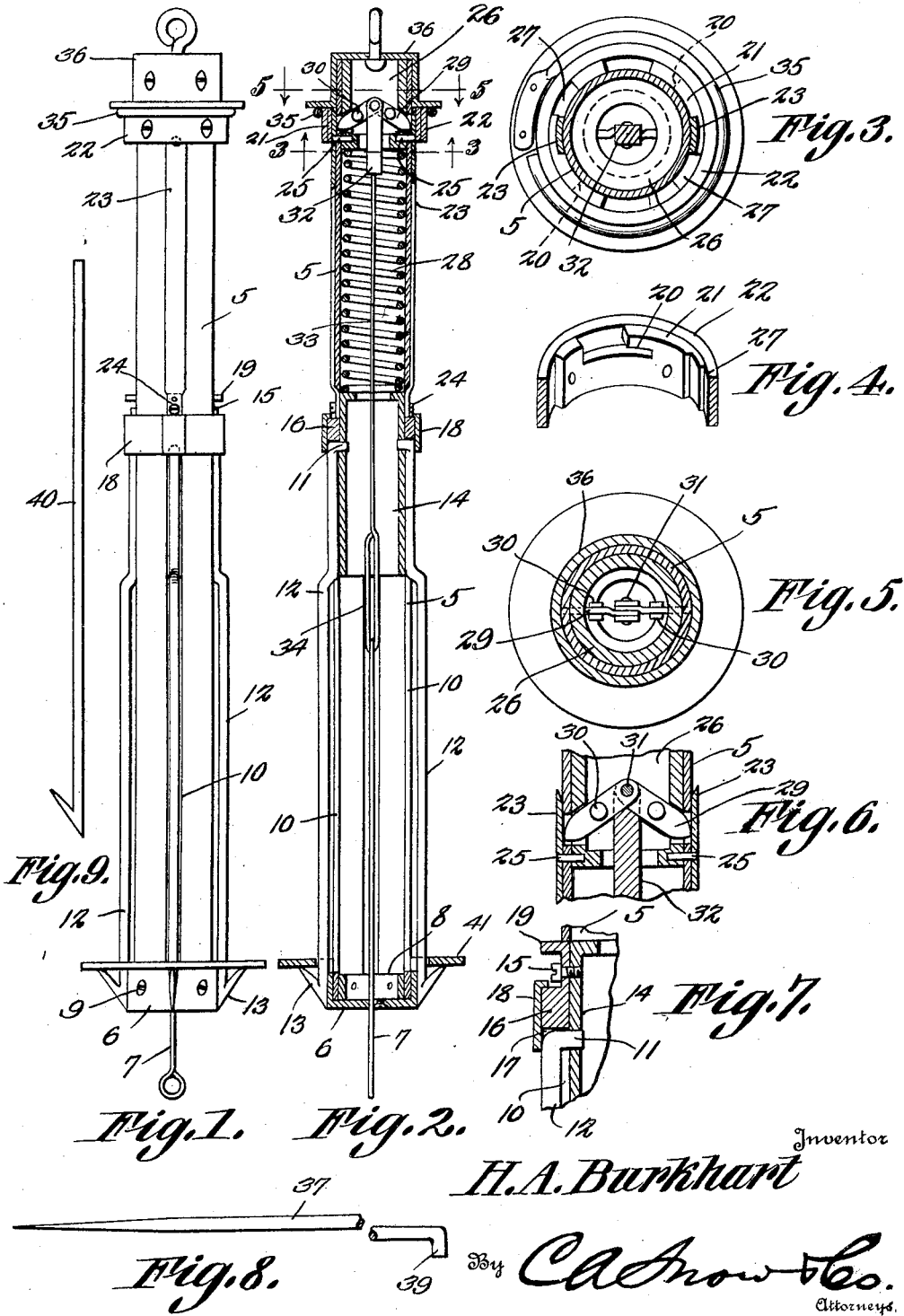

1,519,113

UNITED STATES PATENT OFFICE.

HENRY A. BURKHART, OF FITZGERALD, GEORGIA.

TRAP.

Application filed September 29, 1923. Serial No. 665,649.

*To all whom it may concern:*

Be it known that I, HENRY A. BURKHART, a citizen of the United States, residing at Fitzgerald, in the county of Ben Hill and State of Georgia, have invented a new and useful Trap, of which the following is a specification.

This invention has reference to fishing and trapping, the primary object of the invention being to provide a device including gigs, and means for automatically operating the gigs to accomplish the purpose of the invention.

Another object of the invention is to provide a device of this character wherein the gigs may be readily and easily disconnected from their support to allow the gigs to be readily and easily removed from the fish or animal caught by the trap.

A further object of the invention is to provide means for supporting gigs whereby the gigs may be automatically released from the trap.

A still further object of the invention is to provide a trigger for holding the device normally in its set position novel means being provided and having connection with the trigger for releasing the gigs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a trap constructed in accordance with the invention.

Figure 2 is a longitudinal sectional view through a trap constructed in accordance with the invention.

Figure 3 is a sectional view taken on line 3—3 of Figure 2.

Figure 4 is an enlarged detail view of the gig securing ring.

Figure 5 is a sectional view taken on line 5—5 of Figure 2.

Figure 6 is a detail sectional view disclosing the triggers for releasing the gigs.

Figure 7 is an enlarged detail view disclosing the means for securing the gigs.

Figure 8 is an elevational view of a gig.

Figure 9 is an elevational view of a modified form of gig.

Referring to the drawing in detail, the trap includes a tubular body portion indicated at 5, the same being constructed of any suitable metal to meet the requirements of usage.

One end of the tubular body portion is closed by means of the cap 6 which is formed with a central opening to accommodate the rod 7 on which the bait may be secured. Supported within the tubular member adjacent to the cap 6 is a reinforcing ring 8 held in position by means of the screws 9 that pass through suitable threaded openings in the cap, body portion and ring.

Formed in the wall of the tubular body portion are slots 10 which extend from one end of the tubular body portion terminating at points intermediate the ends thereof. These slots provide clearances for the right angled ends 11 of the gigs 12 which are formed with the usual head 13 to insure against the gigs becoming displaced from the object in which they are projected.

The reference character 14 designates a tubular supporting member that operates in the tubular body portion 5, the tubular supporting member being provided with openings to receive the right angled ends 11 of the gigs, whereby the gigs may be secured to the member 14 to move therewith.

Secured to the member 14, by means of the screws 15 are stops 16 which are formed with cut out portions 17 to receive the inner ends of the gigs 12. These stops 16 are designed to move through the slots 10 of the tubular body portion and advance the gigs towards the outer end of the body portion when the triggers to be hereinafter more fully described, release the member 14.

In order that the gigs will be held in position in the member 14, a sleeve 18 is provided, which sleeve is adapted to be moved over the inner ends of the gigs 12 when they have been positioned in the openings of the tubular member 14.

Fingers 19 are formed on the stops 16 which fingers are adapted to be engaged by the walls of the openings 20 formed in the plates 21 which in turn are secured to the ring member 22, the ring member 22 being of a construction to slide over the tubular body portion and engage the fingers 19 when it is desired to set the trap or move the gigs to positions as shown by Figure 2 of the drawings.

Extending rearwardly from the tubular member 14 are spring arms 23 that are secured to the member 14 by means of the screws 24, the arms 23 being formed with openings to accommodate the pins 25 that extend through openings in the body portion 5 and are carried by the trigger supporting barrel 26 mounted in the rear end of the body portion 5.

The ring member 22 also acts as a guard to prevent accidental movement of the spring arms 23 to release the gigs and to this end the plates 22 are provided with cut out portions 27, whereby upon rotary movement of the ring 22, cut out portions 27 may be moved opposite to the spring arms 23, when it is desired to allow the arms 23 to move out of engagement with the pins 25.

Supported within the body portion 5 is a coiled spring 28 that has one end thereof contacting with the trigger barrel 26, while the opposite end of the coiled spring engages the member 14, to normally urge the tubular member towards the outer end of the body portion 5 when the triggers have been released.

These triggers are indicated at 29 and include arms having their outer or free ends tapered and extended through openings in the trigger barrel 26 as clearly shown by Figure 6 of the drawing. Lugs 30 are formed on the arms 29 and are adapted to contact with the inner surface of the barrel 26 to restrict movement of the trigger but allow sufficient movement thereof to force the arms 23 from their supporting pins.

The inner ends of the arms 29 are pivotally connected by the pivot pin 31 which also is positioned in the bar 32 that carries the rod 33 formed with a loop 34 at its outer end, which loop provides means for connecting the rod 7 thereto so that the rod 7 when moved forwardly will tend to move the outer ends of the arms 29 into engagement with the spring arms 23 to disengage the pins 25.

A spring member indicated at 35 has connection with the cap 36 that closes the inner end of the tubular body portion 5 and this spring member 35 embraces a portion of the ring member 22 to hold the ring member 22 to the limit of its inward movement by frictional contact therewith.

In the form of the gig as shown by Figure 8 of the drawing, the gig is indicated at 37 and provided with a right angled extremity 39 adapted to be positioned in an opening of the member 14 to secure the gig in position. The gig as shown in this form will permit the animal tampering with the trap to be stuck by the gig but will not act to hold the animal.

As shown by Figure 9 the gig which is indicated at 40 is provided with a relatively straight rear extremity to be engaged by the stop associated therewith and carried by the member 14, should it be desired to eject the gig from the body portion, automatically releasing the same.

In order that the person handling the trap will be protected against the sharp points of the heads 13 of the gigs a guard ring 41 is provided at the outer end of the trap which normally lies in close engagement with the pointed extremities of the heads 13 of the gigs.

In the operation of the device the tubular member 14 is moved to a position as shown by Figure 2 of the drawing, whereby bait is supplied to the free end of the rod 7 so that when the bait connected to the rod 7 is tampered with in any way, the trigger which includes the arms 29 will be moved to throw the arms 23 to their inactive positions, releasing the tubular member 14 and causing the gigs 9 to be extended rapidly to a position beyond the outer end of the body portion 5.

I claim:—

1. In a device of the character described, a tubular body portion, a tubular member slidably mounted within the body portion, stops carried by the tubular member, said tubular body portion having longitudinally disposed slots to receive the stops, gigs having right angled end portions, said right angled end portions adapted to be secured to the slidable tubular member at points adjacent to the stops, spring arms carried by the sliding tubular member, means to engage the arms for holding the slidable member in a set position, and means adapted to contact with the spring arms to release the arms and sliding tubular member.

2. In a device of the character described, a tubular body portion having slots formed in the wall thereof, a gig supporting member within the body portion and movable therethrough, means extending through the slots and carried by the gig supporting member for restricting rotary movement of the gig supporting member, gigs having right angled ends extending through the slots and secured to the gig supporting member, a spring for moving the gig supporting member through the body portion, means for normally holding the spring compressed, and means for releasing the spring to eject the gigs carried by the gig supporting member.

3. In a device of the character described, a tubular body portion, a gig supporting member movable through the body portion, spring arms secured to the gig supporting member and extending rearwardly therefrom, said arms having openings, pins adapted to extend through the openings to hold the gig supporting member in a set position, a coiled spring for normally urging the gig supporting member to the limit of its outward movement, and means adapted to contact with the spring arms to move the spring arms out of engagement with the pins to release the gig supporting member.

4. In a device of the character described, a body portion having slots formed longitudinally thereof, a gig supporting member in the body portion, gigs having right angled end portions, said gig supporting member having openings to receive the right angled end portions of the gigs, a sleeve adapted to engage the gigs to hold the gigs against accidental displacement, a coiled spring within the body portion and adapted to engage the gig supporting member to normally urge the gig supporting member to its active position, means for releasing the gig supporting member, and means for locking the gig supporting member against movement.

5. In a device of the character described, a tubular body portion, said body portion having slots formed therein, a gig supporting member movable through the body portion, gigs carried by the gig supporting member, means for normally urging the gig supporting member to the limit of its outward movement, stops carried by the gig supporting member and having fingers, a ring member adapted to engage the fingers for moving the gig supporting member to its inactive position, and means for releasing the gig supporting member.

In testimony that I claim the foregoing as my own, I have hereto affixed my signature in the presence of two witnesses.

HENRY A. BURKHART.

Witnesses:
  I. E. SIMPSON,
  AGNES ROCKELLI.